US009236800B2

(12) United States Patent
Tang et al.

(10) Patent No.: US 9,236,800 B2
(45) Date of Patent: Jan. 12, 2016

(54) SYSTEM FOR BALANCING CURRENT SUPPLIED TO A LOAD

(71) Applicant: Infineon Technologies Austria AG, Villach (AT)

(72) Inventors: Benjamin Tang, Rancho Palos Verdes, CA (US); Scott Wilson Southwell, Seal Beach, CA (US); Kenneth A. Ostrom, Palos Verdes Estates, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/068,721

(22) Filed: Oct. 31, 2013

(65) Prior Publication Data
US 2014/0055114 A1    Feb. 27, 2014

Related U.S. Application Data

(60) Continuation of application No. 13/178,327, filed on Jul. 7, 2011, now Pat. No. 8,598,853, which is a division of application No. 11/364,750, filed on Feb. 28, 2006, now Pat. No. 8,008,901.

(51) Int. Cl.
G05F 1/00    (2006.01)
H02M 3/158   (2006.01)
H02M 3/157   (2006.01)

(52) U.S. Cl.
CPC .............. *H02M 3/158* (2013.01); *H02M 3/157* (2013.01); *H02M 3/1584* (2013.01); *Y10T 307/565* (2015.04)

(58) Field of Classification Search
CPC ... H02M 3/158; H02M 3/1584; H02M 3/157; Y10T 307/565

USPC .......................................................... 323/282
See application file for complete search history.

(56) References Cited

U.S. PATENT DOCUMENTS

| | | |
|---|---|---|
| 6,144,194 A | 11/2000 | Varga |
| 6,366,069 B1 | 4/2002 | Nguyen et al. |
| 6,563,294 B2 | 5/2003 | Duffy et al. |
| 6,646,450 B2 | 11/2003 | Liebler |
| 6,674,274 B2 | 1/2004 | Hobrecht et al. |
| 6,683,441 B2 | 1/2004 | Schiff et al. |
| 6,795,009 B2 | 9/2004 | Duffy et al. |
| 6,906,536 B2 | 6/2005 | Pearce et al. |
| 6,965,502 B2 | 11/2005 | Duffy et al. |
| 6,995,483 B2 | 2/2006 | Kohout et al. |
| 7,007,176 B2 | 2/2006 | Goodfellow et al. |
| 7,391,192 B2 | 6/2008 | Ostrom et al. |
| 7,521,913 B2 | 4/2009 | Tang et al. |
| 7,570,036 B2 | 8/2009 | Tang et al. |
| 7,696,794 B2 | 4/2010 | Feldtkeller |
| 2003/0034792 A1 | 2/2003 | Ostrom et al. |
| 2004/0052098 A1 | 3/2004 | Burstein et al. |
| 2004/0150928 A1 | 8/2004 | Goodfellow et al. |

(Continued)

*Primary Examiner* — Daniel Cavallari
(74) *Attorney, Agent, or Firm* — Murphy, Bilak & Homiller, PLLC

(57) ABSTRACT

A system for balancing current supplied by a plurality of regulators coupled to a load includes circuitry operable to measure an average load current supplied by each regulator, determine an overall average current to be shared by the plurality of regulators, and compare each average load current with the overall average current to be shared by the plurality of regulators. The circuitry included in the system is also operable to adjust an output current of one or more of the plurality of regulators so that the plurality of regulators supply the same current to the load.

15 Claims, 7 Drawing Sheets

(56) References Cited

U.S. PATENT DOCUMENTS

| | | |
|---|---|---|
| 2005/0219926 A1 | 10/2005 | Tai et al. |
| 2006/0001408 A1 | 1/2006 | Southwell et al. |
| 2006/0055388 A1 | 3/2006 | Tang et al. |
| 2006/0087296 A1 | 4/2006 | Marino et al. |
| 2006/0132110 A1 | 6/2006 | Tang |
| 2006/0152205 A1 | 7/2006 | Tang et al. |
| 2006/0208716 A1 | 9/2006 | Chapuis |
| 2006/0239046 A1 | 10/2006 | Zane et al. |
| 2006/0250119 A1 | 11/2006 | Ostrom et al. |
| 2009/0121695 A1 | 5/2009 | Pierson et al. |
| 2009/0146620 A1 | 6/2009 | Ng et al. |
| 2009/0146621 A1 | 6/2009 | Tang et al. |
| 2009/0146643 A1 | 6/2009 | Ostrom et al. |
| 2009/0167271 A1 | 7/2009 | Tang et al. |

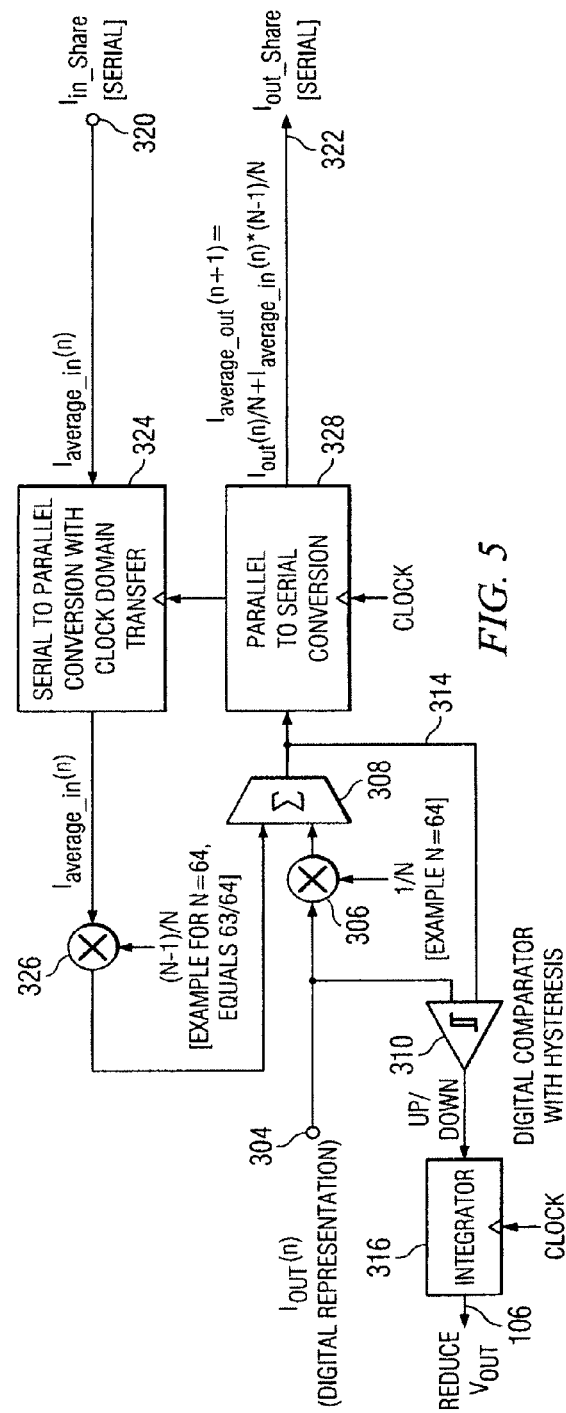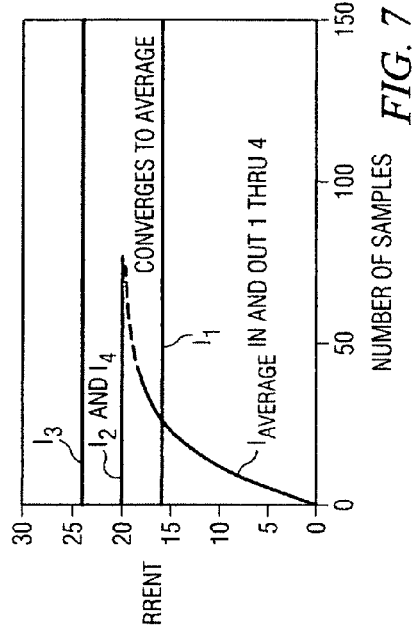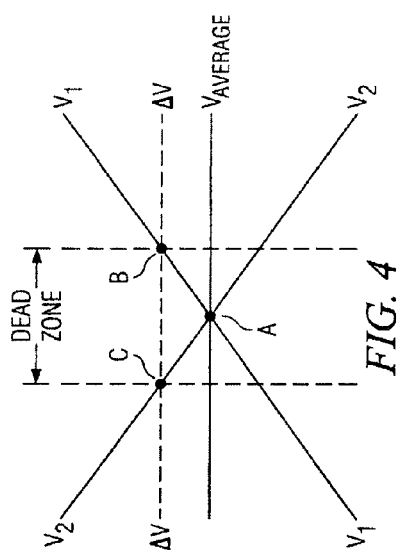
FIG. 7
FIG. 5
FIG. 4

SYSTEM FOR BALANCING CURRENT SUPPLIED TO A LOAD

PRIORITY CLAIM

This application is a continuation of, and claims priority to, U.S. application Ser. No. 13/178,327 filed 7 Jul. 2011, which in turn is a divisional of U.S. application Ser. No. 11/364,750 filed 28 Feb. 2006, the content of said applications incorporated herein by reference in their entirety.

CROSS REFERENCES TO RELATED US PATENT APPLICATIONS AND PATENTS

1. SYSTEM AND METHOD FOR HIGHLY PHASED POWER REGULATION, Ser. No. 10/112,738 filed Apr. 1, 2002, inventors: Duffy, et al, now U.S. Pat. No. 6,563,294.
2. SYSTEM, DEVICE AND METHOD FOR PROVIDING VOLTAGE REGULATION TO A MICROELECTRONIC DEVICE, Ser. No. 10/103,980, filed Mar. 22, 2002, inventors: Duffy et al, now U.S. Pat. No. 6,965,502.
3. SYSTEM AND METHOD FOR CURRENT HANDLING IN A DIGITALLY CONTROLLED POWER CONVERTER, Ser. No. 10/237,903, filed Sep. 9, 2002, inventors: Duffy et al, now U.S. Pat. No. 6,795,009.
4. SYSTEM AND METHOD FOR HIGHLY PHASED POWER REGULATION USING ADAPTIVE COMPENSATION CONTROL, Ser. No. 10/109,801, filed Oct. 15, 2001, inventors: Goodfellow et al., now U.S. Pat. No. 7,007,176.
5. DIGITAL CALIBRATION WITH LOSSLESS SENSING IN A MULTIPHASE SWITCHED POWER CONVERTER, Ser. No. 10/884,840, filed Jul. 2, 2004, inventors: Southwell et al.
6. MULTI-THRESHOLD MULTI-GAIN ACTIVE TRANSIENT RESPONSE CIRCUIT AND METHOD FOR DIGITAL MULTIPHASE PULSE WIDTH MODULATED REGULATORS, Ser. No. 10/938,031, filed Sep. 10, 2004, inventors Tang et al.
7. FINE RESOLUTION PULSE WIDTH MODULATION PULSE GENERATOR FOR USE IN A MULTIPHASE PULSE WIDTH MODULATED VOLTAGE REGULATOR, Ser. No. 11/112,707, filed Apr. 23, 2005, inventor TANG.

The foregoing are hereby incorporated herein by reference.

TECHNICAL FIELD

The present application generally relates to providing regulated power to a load and more particularly to balancing current provided by multiple power regulators.

BACKGROUND

Power regulation for a microelectronic device such as a microprocessor must include a steady voltage along a predetermined load line and an ability to respond to dynamic current demands of the processor. For example, as a microprocessor executes instructions, particularly at faster rates, severe power transients and widely varying current requirements are likely to occur. Buck converters have been advantageously utilized to meet the power demands of microprocessors; which typically require very high currents at very low voltages.

A regulator located at or near the load can improve the precision of regulated power provided to the load. Point of load (POL) regulators are well known. In the cross-referenced patent applications, various power regulators have been disclosed. However, in some applications, more than one regulator is required because one regulator cannot provide the large amount of current required either as a steady-state or as a transient response. A problem with utilizing multiple regulators is the inefficiency that occurs when various regulators provide different levels of current to the load.

In the multi-phase regulators disclosed, for example in MULTI-THRESHOLD MULTI-GAIN ACTIVE TRANSIENT RESPONSE CIRCUIT AND METHOD FOR DIGITAL MULTIPHASE PULSE WIDTH MODULATED REGULATORS, Ser. No. 10/938,031, filed Sep. 10, 2004, inventors Tang et al. and DIGITAL CALIBRATION WITH LOSSLESS SENSING IN A MULTIPHASE SWITCHED POWER CONVERTER, Ser. No. 10/884,840, filed Jul. 2, 2004, inventors: Southwell et al, the balancing of current among the phases could be achieved by controlling the output of the pulse widths supplied by the multi-phase pulse width modulators. However, the problem of balancing the output of multiple multi-phase (or single phase) regulators was not described.

SUMMARY

According to an embodiment of a method of balancing current supplied by a plurality of regulators coupled to a load, the method includes: measuring an average load current supplied by each regulator; determining an overall average current to be shared by the plurality of regulators; comparing each average load current with the overall average current to be shared by the plurality of regulators; and adjusting an output current of one or more of the plurality of regulators so that the plurality of regulators supply the same current to the load.

According to an embodiment of a method of supplying current to a load, the method includes: supplying current to the load during a first phase via a first regulator; supplying current to the load during a second phase via a second regulator; determining a first average current provided to the load during the first phase and a second average current provided to the load during the second phase; determining an overall average current to be shared by the first and second regulators; comparing the first average current provided to the load during the first phase with the overall average current to be shared by the first and second regulators; and comparing the second average current provided to the load during the second phase with the overall average current to be shared by the first and second regulators.

According to another embodiment of a method of supplying current to a load, the method includes: coupling a first regulator to the load; coupling a second regulator to the load; and balancing a current provided by the first regulator to the load and a current provided by the second regulator to the load based on a comparison of an overall average current value with the current provided by each regulator.

Those skilled in the art will recognize additional features and advantages upon reading the following detailed description, and upon viewing the accompanying drawings.

BRIEF DESCRIPTION OF DRAWING FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 4 is a waveform diagram illustrating the operation of an embodiment of a current sharing feature.

FIG. 5 is a block diagram illustrating an exemplary digital embodiment.

FIG. 7 is a waveform diagram illustrating the operation of the four phase embodiment illustrated in FIG. 6A.

DETAILED DESCRIPTION

Figure 1:
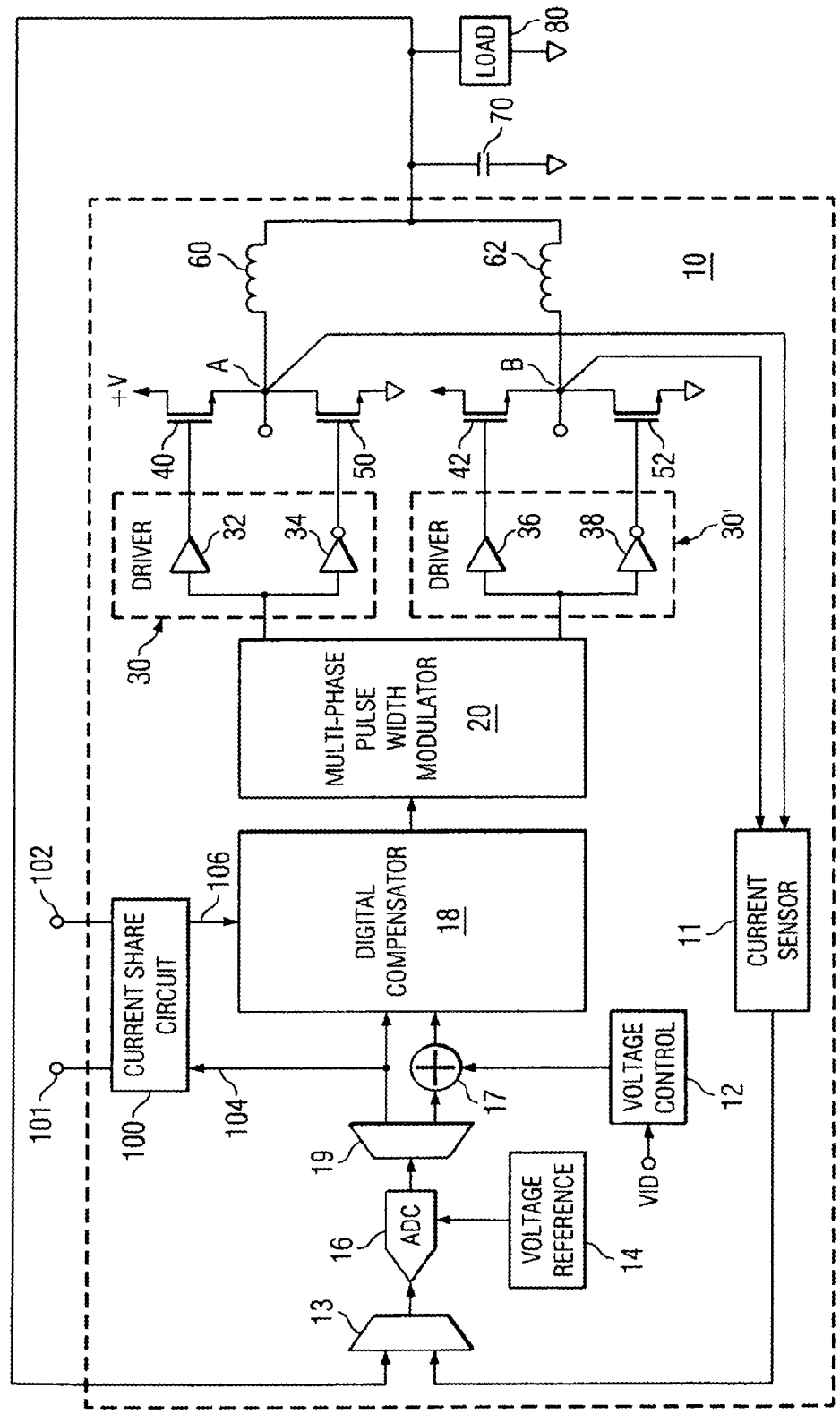
FIG. 1 is a block diagram of a regulator circuit incorporating a power supply balancing circuit in accordance with an embodiment.

Refer now to FIG. 1, for a block diagram illustrating a switched power converter, i.e. regulator, incorporating the current sharing circuit 100 in accordance with an embodiment. The regulator 10 (without the current sharing circuit 100) has previously been described in detail, for example, in the cross-referenced patent applications that have been incorporated herein by reference. This type of regulator is also known as a Buck Converter or Multiphase Buck Converter and it converts a relatively high supply potential (+V) at e.g. 12 volts to a low voltage, e.g. 1 to 3 volts that is provided at very high current levels to a load. Regulator 10 is shown including Single or Multi-phase Pulse Width Modulator (PWM) 20.

The output of PWM 20 is a series of pulses on each of its output lines, a first phase output being provided to the driver in power stage 30 and a second phase output being provided to the driver circuit in power stage 30'. In a multi-phase system having more than 2 phases, additional phases are connected in a similar manner. Low side FETs 50 and 52, inductors 60 and 62, and capacitor 70 are typically discrete devices. In each phase, (say the first phase for example), a pulse output stage comprises a high side FET (40), a low side FET (50) and an inductor (60). Similarly, the pulse output stage for the second phase comprises a high side FET 42, a low side FET 52 and an inductor 62. The pulse output stage charges up capacitor 70 and supplies power to the load. Load 80 is typically a microelectronic component, such as a microprocessor, requiring very accurate power that is regulated and maintained during rapidly changing power requirements.

Current sensor 11 senses the current at nodes A and B. This is the current supplied to load 80. The output of the current sensor 11, as well as the load voltage are provided to multiplex circuit 13. Multiplex circuit 13 provides these values to analog to digital converter (ADC) 16 at the time when the phase desired to be measured is active. ADC 16 also receives an input from voltage reference 14. The reference voltage from block 14 is used to calibrate the output of ADC 16 to that reference voltage. A VID input is received at voltage control 12. VID is a digital number provided by the microprocessor manufacturer describing specific power requirements. Analog-digital converter 16 also receives, as another input, the voltage at load 80 coupled through multiplex circuit 13. The output of ADC 16 is a digital voltage value that is de-multiplexed through de-multiplex circuit 19 to current share circuit 100 (via conductor 104) and digital compensator 18. The output of ADC 16 is also compared to the output of voltage control circuit 12 (the target voltage) in summer 17 and provided as a digital error voltage to digital compensator 18.

As disclosed in the prior patent applications, digital compensator 18 then provides an input to PWM 20 in order to modify the width of the pulses provided to the drivers in power stages 30 and 30', etc. of each of the two phases in the illustrated example, and other phases, when utilized. However, in accordance with an embodiment, current share circuit 100 provides an output to digital compensator 18 on conductor 106 to further modify (increase or decrease, as the case may be) the width of the pulses provided to the drivers in power stages 30 and 30', etc. Thus, the output of regulator 10 will provide the same current to load 80 as the other regulators that are also coupled to load 80.

In the operation of the circuit of FIG. 1, the first phase is driven by driver circuits 32 and 34. Circuit 32 drives the gate of FET 40 with a signal that is complementary to the output of circuit 34 that drives the gate of FET 50. FET 40 and 50 have their drain-source paths connected in series, at a common point A, between a first potential source (+V) and a second potential source (ground). Since both FET 40 and 50 are shown as N-channel devices, only one of the two transistors is on at any one time. Of course, if transistor 40 were to be replaced with a P-type transistor, then the same phase signal could be used to drive the gate of both transistor 40 and 50. In either case, there is never a direct current path between +V and ground.

The second phase output of PWM 20 is provided to driver circuits 36 and 38 during the second phase in the same way that circuits 32 and 34 receive the pulse width modulated signals during the first phase. Circuit 36 then drives the gate of FET 42 and circuit 38 drives the gate of FET 52. Note that although two phases are shown, any number of phases can be used. Larger number of phases can provide higher current levels and also smoother and more accurately regulated power to the load.

In accordance with an embodiment, further improvement is provided by the addition of additional regulators such as regulator 10, as described herein. Then, assuming that one regulator (such as regulator 10) can deliver 30 Amps, then 4 power regulators can deliver 120 Amps. In order to achieve optimum efficiency, the total current provided to the load should be shared equally by all regulators.

By way of further describing the operation of the circuit of FIG. 1, during the first phase, while the pulse width modulated waveform turns high side FET 40 on, current flows through FET 40 into node A and through inductor 60 to charge capacitor 70 and provide power to load 80. On the other hand, when low side FET 50 is turned on, current flows through FET 50. High side FET 42 and low side FET 52, connected in common at node B operate in a similar manner during the second phase. It is desired to measure the current at node A and node B (and other corresponding nodes in the additional regulators) as an indication of the current being supplied to the load by each regulator. The cross-referenced patent applications show how the measurements of current taken at nodes A and B can be taken accurately and in a relatively lossless manner. These measurements are then used to better regulate the power provided to load 80 and in the case of this embodiment, to equalize the amount of current provided by each one of a plurality of power regulators.

In accordance with an embodiment, current share circuit 100 is coupled to similar current share circuits in the other plurality of power regulators by terminals 101 and 102. For example, if terminal 101 is a terminal for Ishare_in to current share circuit 100, then terminal 102 is a terminal for Ishare_out. The coupling of one or more additional power regulators to regulator 10 is achieved by the coupling of the respective terminals 101 and 102 to current share circuits in the additional power regulators.

Figure 2:
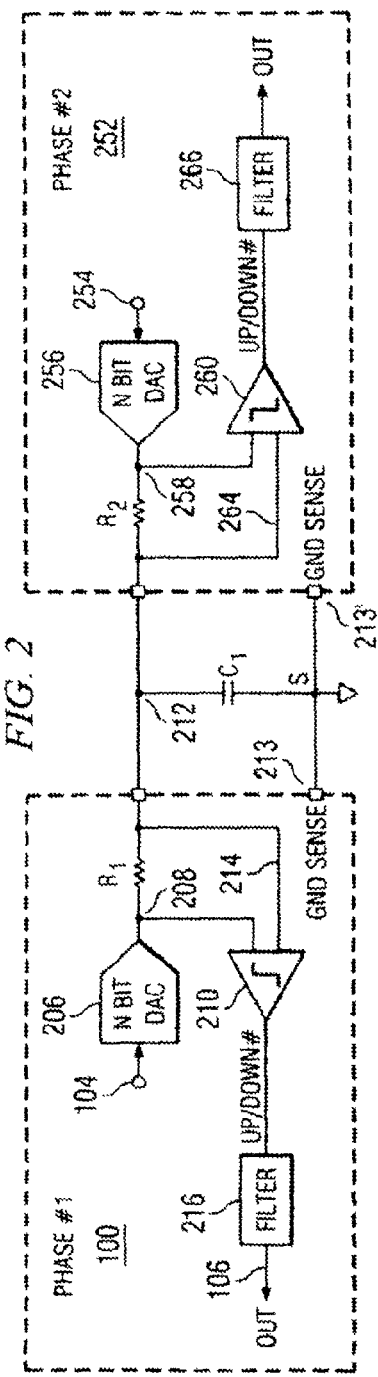
FIG. 2 is a simplified block diagram illustrating a current balancing circuit with 2 regulators in a 2 phase system.

With continued reference to FIG. 1, refer also to FIG. 2 for a simplified block diagram of an exemplary embodiment. In particular, FIG. 2 illustrates current sharing with 2 regulators. This is the case where a load 80 is supplied by two regulators, such as regulator 10 in FIG. 1. The circuit of FIG. 2 illustrates two current share circuits, one in each of two regulators. Thus, for example, current share circuit 100 is a more detailed illustration of current share circuit 100 within the regulator 10 of FIG. 1; while current share circuit 252 is a similar circuit within a second regulator coupled to the regulator 10 of FIG. 1. Circuit 100 receives the digitized value of the average current sensed at the load during the time that regulator 1 is active (phase 1 time) at terminal (conductor) 104. This value is received into N Bit Digital to Analog Converter (DAC) 206. DAC 206 can conveniently be a 6 bit DAC or the like. The analog current value received at node 208 is the first phase current (current sensed when regulator 10 is active) and is supplied as a first input to comparator 210. Resistor R1 couples node 208 to node 212 and external capacitor C1 which has its other capacitor lead coupled to ground potential. Node 212 is coupled to the second input of comparator 210 by conductor 214. The output of comparator 210 is coupled to the input of filter 216; which provides an output that will appropriately adjust the current output of the regulator, e.g. regulator 10. In accordance with an exemplary embodiment, node 212 is coupled to terminal 101 while ground sense node 213 is coupled to terminal 102.

Circuit 252 receives the digitized value of the average current sensed at the load during the time that regulator 2 is active (phase 2 time), at terminal 254. This value is received into N Bit Digital to Analog Converter (DAC) 256. DAC 256 can conveniently be a 6 bit DAC or the like. The analog current value received at node 256 is the second phase current and is supplied as a first input to comparator 260. Resistor R2 couples node 258 to node 212 and external capacitor C1 which has its other capacitor lead coupled to ground potential. Node 212 is coupled to the second input of comparator 260 by conductor 264. The output of comparator 260 is coupled to the input of filter 266; which provides an output that will appropriately adjust the current output of the second regulator.

With continued reference to FIG. 2, note that external capacitor C1 generates a voltage that is proportional to the average currents of regulator 1 and regulator 2. That is, at node 212, the first average (regulator 1) current and the second average (regulator 2) current are added and then divided by 2 to represent the overall average current sensed at the load. This overall average current (represented by a voltage) is referenced to ground sense 213 (for regulator 100) and 213' (for regulator 252). Nodes 213 and 213' are connected in a star configuration (node S) at capacitor C1, thereby preventing variations in the local ground voltage levels from affecting the accuracy of the average current determination. This overall average current value (from summing node 212) is provided to comparators 210 and 260. The respective comparators then provide either an up or down output to indicate that the corresponding regulator should provide more or less current to achieve the average. In order to avoid constant readjustments in response to minor changes (and even possibly noise), comparators 210 and 260 are provided with a hysteresis feature as will be described in greater detail below.

Figure 3:
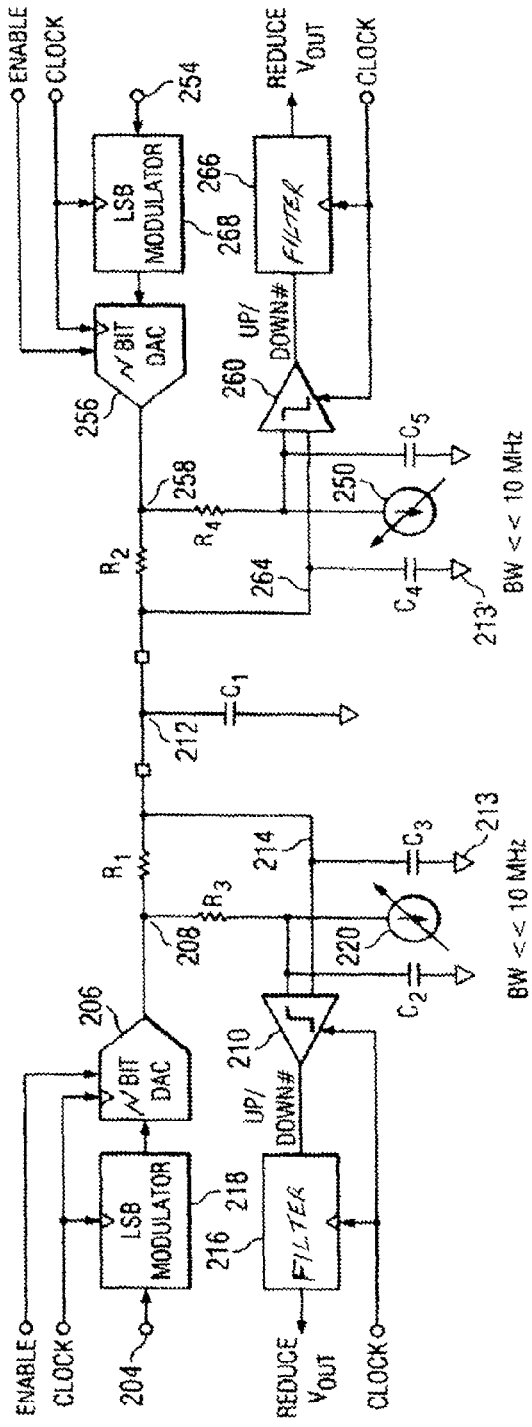
FIG. 3 is a block diagram illustrating current sharing in accordance with an embodiment.

Refer now to FIG. 3, which is a more detailed block diagram of the exemplary embodiment. Corresponding elements previously described with reference to FIG. 2 have been identified with corresponding reference numerals. Least Significant Bit (LSB) Modulator 218 is shown coupled between terminal 204 and 6 Bit DAC 206. LSB Modulator 218 is a "digital rounding device" and can be of a construction known in the art. For example, it can be a Sigma Delta converter that looks at the number of binary 1's and 0's received over a period of time and then provides a signal to reduce the output voltage or current of the power source. It is used in the combination of this invention in case the precision of the digital current value received at terminal 204 is greater than the number of bits to be converted by DAC 206. For example, if the load current representation has a precision of 10 bits, then LSB Modulator 218 rounds this digital number to 6 bits. In its most accurate form, LSB Modulator 218 tracks the value of the four least significant bits to assure that the six bits inputted into 6 bit DAC 206 accurately define the measured current value. The LSB Modulator 218, DAC 206, Integrator 216 and Comparator 210 receive the same clock signal to operate synchronously. DAC 206 also receives an "Enable" signal to gate the output during a desired portion of the first phase. Integrator 216 is a filter that integrates a number of Up/Down signals from Comparator 210 before sending a signal, for example, to reduce the current output of the current source associated with the first phase. Note that comparator 210 is effectively an analog to digital converter in the sense that after comparing the level of the two analog input signals it provides a binary up or binary down number to integrator 216.

Resistor R3 and current source 220 are coupled in a series path between node 208 and a potential level such as ground. These form a biasing circuit to the input of comparator 210 coupled to R3 resulting in a hysteresis effect. By setting this programmable bias level, the signal provided as an input to comparator 210 can be varied from the actual phase one voltage at node 208. Thus, comparator 210 can provide a down number output only after the phase one voltage exceeds the average voltage received on conductor 214 by "delta V", a value determined by the programmed level applied to current source 220 in combination with the value of resistor R3. Capacitors C2 and C3 are filter capacitors used in their known manner.

The added elements on the second regulator side of the FIG. 3 illustration are the same as for first phase and perform the same functions. The clock signals coupled to DAC 256, LSB Modulator 268, Comparator 260 and Integrator 266, as well as the Enable signal coupled to DAC 256 are for the second phase. The programmable bias set by current source 250 and resistor R4 are usually set at the same level as for the regulator 1 circuit. Capacitors C4 and C5 are of the same values as C2 and C3.

The hysteresis function can be best understood by referring to FIG. 4 as well as continued reference to FIG. 3. At the intersection of voltage V1 and V2, at point A, both power sources are providing the same average voltage "V average". This is the ideal situation. As V1 increases to exceed delta V (point B), a correction signal to reduce the output voltage of the power stage for regulator 1 is provided by integrator 216. Similarly, as V2 increases to exceed delta V (point C), a correction signal to reduce the output voltage of the power stage for regulator 2 is provided by integrator 266. As long as neither V1 nor V2 exceeds delta V, no correction signal is provided.

V1 is the voltage at node 208 and is equal to the current detected at the load during the first phase times a constant. Delta V is the voltage drop across resistor R3 as determined by the value of R3 times the amplitude of the programmable current drawn by current source 220. Thus, the input voltage applied to comparator 210 is V1 minus delta V. Similarly, the input voltage applied to comparator 260 is V2 (the voltage at node 258 as determined during the second phase) minus delta V (as determined by the value of R4 times the amplitude of the programmable current drawn by current source 250). Note the dead zone in FIG. 4 where no correction is provided.

In the just described embodiments of FIGS. 2-4, the average current and voltage levels that were compared to the actual current/voltage levels at regulator 1 and regulator 2 were analog values as compared in comparators 210 and 260. Refer now to FIG. 5, which is a block diagram of a current share regulator for one regulator that is entirely digital. The digital representation of the load current measured during the time the illustrated regulator is active is received at terminal 304 (connected for example to conductor 104 in FIG. 1) and is inputted to digital divider 306 and digital comparator 310. In digital divider 306 the digital representation of load current is divided by an arbitrarily selected constant N, which can be equal to 64. This weighted value of current is provided to summer 308. The output of summer 308 is provided as a second input to comparator 310 on conductor 314. The output of comparator 310 is provided to integrator 316. Integrator 316 also receives a clock signal, as is well known for such devices. The output of integrator 316 is coupled to the digital compensator 18 (FIG. 1) (via conductor 106, for example) and is a signal to reduce the output of the regulator when the digital comparator 310 has provided an output indicating that the output of the regulator is greater than the shared average current value by more than the hysteresis amount delta V, as illustrated in FIG. 4.

The illustrated regulator is typically connected to other regulators. Each such regulator is active during its assigned time slot (phase). The previous regulator provides an Iin_Share input on terminal 320. An Iout_Share output is provided to the next regulator on output terminal 322. (These correspond, for example to terminals 101 and 102 in FIG. 1.) The signal on the input terminal 320 is a serial digital bit stream representing the average shared current and is inputted into serial to parallel converter 324. Serial to parallel converters are well-known, as for example shift registers that receive digital information in series at a first clock frequency and output the digital information in parallel at a second (slower) clock frequency. The average current value is provided to digital multiplier circuit 326. This weighted current value is provided as a second input to summing circuit 308. In the ideal case, when the current representation on terminal 304 and terminal 320 are equal, the output of summer 308 on conductive line 314 will be equal to the value on terminal 304. In any case, the value on conductor 314 is represented by the following formula: I average_out(n+1)=I out(n)/N+I average_In(n)*(N−1)/N. This current value is inputted to parallel to serial converter 328 where it is converted into a serial bit stream and provided to the next phase on terminal 322, as will be more clearly understood by reference to FIG. 6A.

Figure 6A:
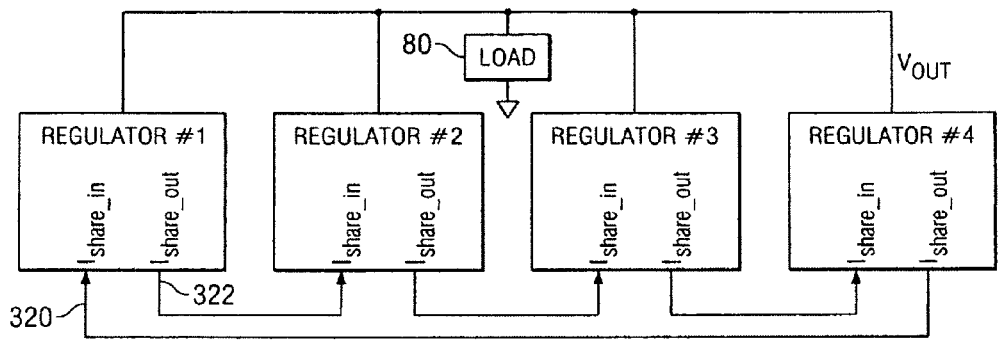
FIG. 6A is a block diagram illustrating an exemplary embodiment of a digital implementation of current sharing in four phases.

As previously noted, the embodiments described herein can be adapted to control N regulators operated during N phases. Refer now to FIG. 6A for an example of a four phase configuration to illustrate how four regulators (operating in the digital mode as illustrated for example in FIG. 5) would be connected. Each of these 4 regulators receives the same frequency clock input (not shown) and is therefore frequency coherent. However, the phase occurrence of when a particular regulator is enabled is arbitrary.

In this four regulator embodiment, the concept is the same as in the previously described two phase embodiments in that the shared current I share is desired to be the same in all power stages. The connection shown in FIG. 6A is known as a daisy chain and would be used with digital current share circuits as illustrated in FIG. 5. The digital representation of the shared current (Ishare_in) is inputted into Regulator #1 (via conductor 320) from where it is outputted (as Ishare_out) (via conductor 322) into Regulator #2. The output of Regulator #2 is inputted to Regulator #3. The output of Regulator #3 is inputted into Regulator #4. The output of Regulator #4 is the shared current inputted into Regulator #1. The load 80 has been identified with the same reference numeral as in the FIG. 1 illustration.

Figure 6B:
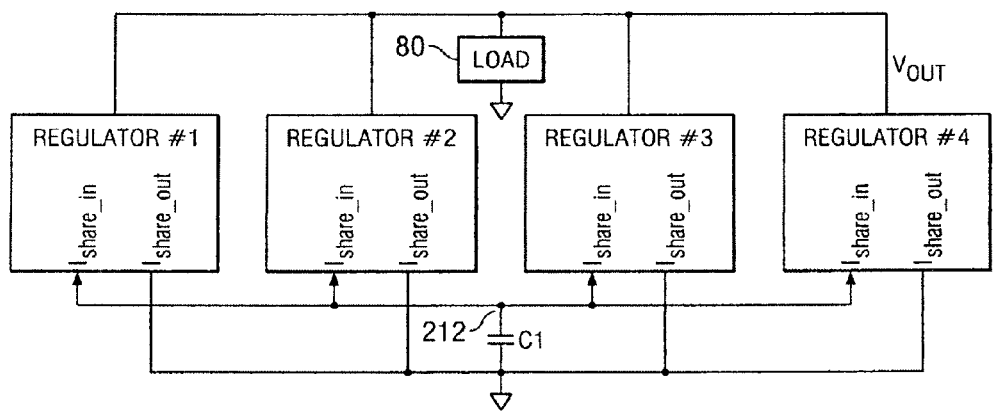
FIG. 6B is a block diagram illustrating an exemplary embodiment of an analog implementation of current sharing in four phases.

FIG. 6B is an example of a four regulator, i.e. four phase configuration to illustrate how four regulators (operating in the analog mode as illustrated for example in the FIG. 3 two regulator example) would be connected. Capacitor C1 and load 80 have been identified as in previous drawing figures. In the analog mode, all the Ishare_in terminals (corresponding to terminal 101 in FIG. 1) are coupled in common and to node 212 (FIG. 3). All the Ishare_out terminals (corresponding to terminal 102 in FIG. 1) are coupled in common and to a commoned ground connection (e.g. 213 and 213' in FIG. 3).

The operation of the 4 Regulator (i.e. 4 phase) system of FIG. 6A is best understood by referring to the waveform of FIG. 7. FIG. 7 illustrates the convergence of the average current ring. Assume that initially the system is unbalanced. Thus regulator 1 (i.e. the first phase) is providing a current I1=16 Amps. Regulator 2 (i.e. the second phase) is providing a current I2=20 Amps. Regulator 3 (i.e. phase 3) is providing a current I3=24 Amps. Regulator 4, (i.e. phase 4) is providing a current I4=20 Amps. Assume that N=64 (average weighting). The arbitrarily selected constant N determines the gain or convergence rate, i.e. error v. number of samples. As illustrated in FIG. 7, the average current I average daisy chain converges to the average of the 4 regulators in approximately 100 cycles (i.e. 100 samples). The error is approximately 1/N*K, where N=the number of averages (64) and K=the number of regulators. The average current in all phases is thus achieved iteratively.

Figure 8:
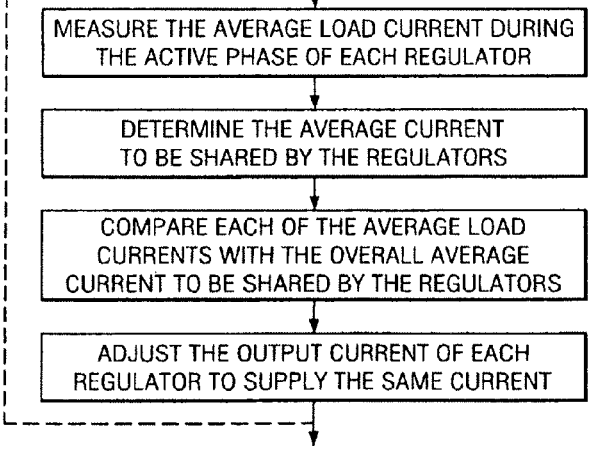
FIG. 8 is a flow chart illustrating an exemplary embodiment of a method of operation.

Refer now to FIG. 8, which is a flow chart illustrating an embodiment. As shown, we measure the average load current during the active phase of each regulator. These measurements can be taken in a number of ways previously described in the above referenced patent application, entitled: DIGITAL CALIBRATION WITH LOSSLESS SENSING IN A MULTIPHASE SWITCHED POWER CONVERTER, that described various lossless current measuring techniques. The measurement can then be digitized and processed digitally, as illustrated in FIG. 5, or converted to an analog value, as in FIGS. 2 and 3. All subsequent steps can be performed either digitally or by analog techniques. We then determine the average current to be shared by the regulators. In accordance with one embodiment, for multiple regulated supplies, the average current to be shared by the regulated power supplies can be achieved by an iterative process, as shown in FIG. 7, with a daisy chain as illustrated in FIG. 6A. The dashed line in FIG. 8 represents the iterative process. We then compare each of the average load currents with the overall average current to be shared by the regulators. Lastly, we adjust the output current of each regulator to supply the same current. This adjustment can be performed with a hysteresis technique, as illustrated in FIG. 4.

As previously noted, the embodiments described herein utilize the accurate and relatively lossless sensing of load current. These measurements can be taken, for example at nodes A and B (FIG. 1). Unfortunately, voltage measurements taken at nodes A and B are only an approximation of current. The voltage measurement taken at node B for example, when low side FET is in its conductive state is the product of the current and on resistance (also referred to as RDSON) of low side FET 52. Because of process variations in the fabrication of FET 52 and other field effect transistors on the semiconductor chip and the fact that conductance is a function of temperature, measurements taken at nodes A and B, etc. are not a truly accurate measurement of current, unless actual RDSON is known. To overcome this problem actual RDSON can be determined as disclosed in the above referenced patent application entitled: DIGITAL CALIBRATION WITH LOSSLESS SENSING IN A MULTIPHASE SWITCHED POWER CONVERTER.

Figure 9:
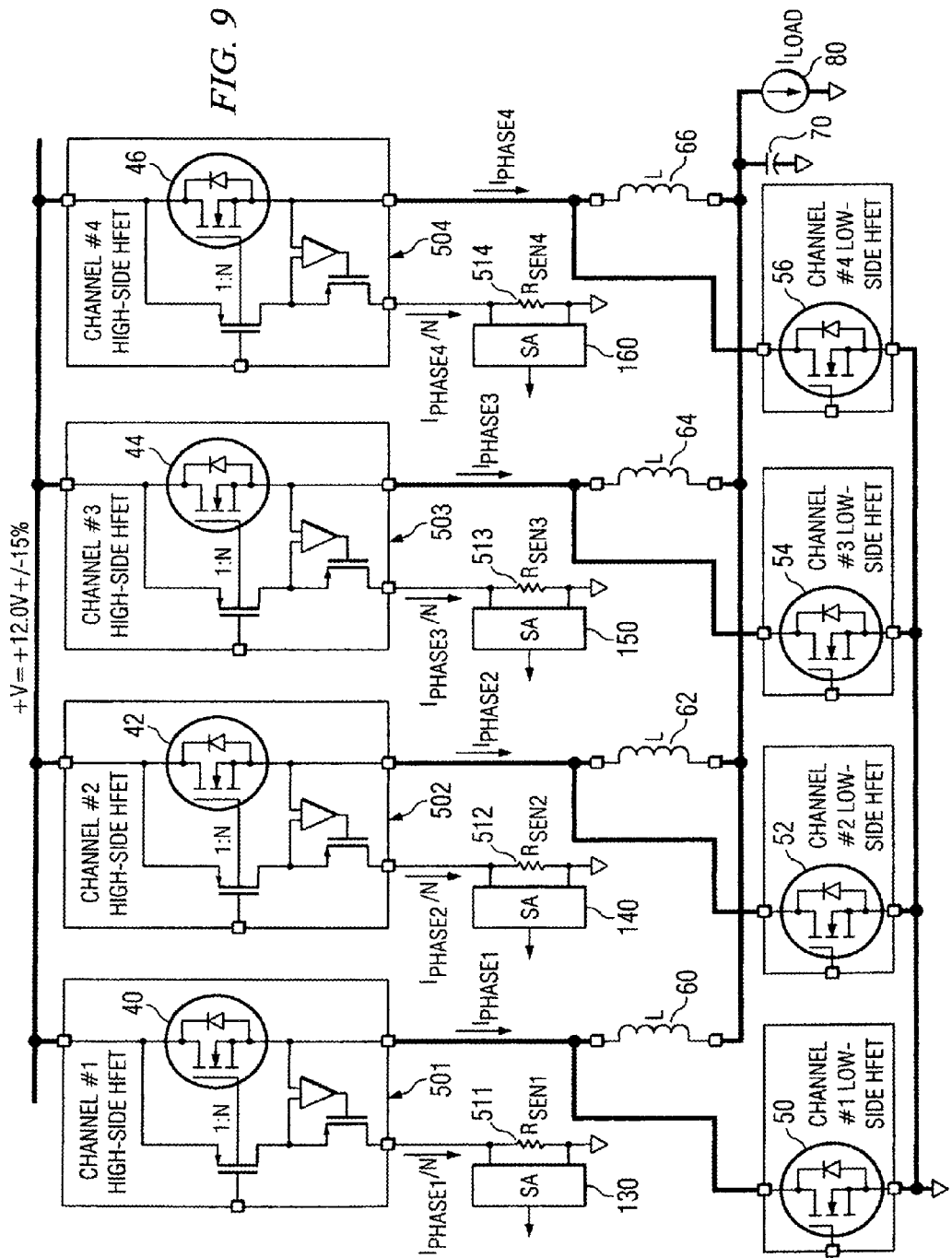
FIGS. 9-10 illustrate circuits for sensing load current.

Current flowing through the load can be measured by relatively lossless techniques other than determining the RDSON of the low side FET. Refer now to FIG. 9, which illustrates a lossless technique for measuring load current utilizing a current mirror and precision resistor placed in parallel with the high side FET. FIG. 9 is similar to FIG. 1 and to the extent possible, corresponding elements have been numbered with corresponding reference numerals. However, since the FIG. 9 embodiment is a four phase example, additional high side FETs 44, 46, additional low side FETs 54, 56, and additional inductors 64, 66 have been added. Note that block 501 includes, in addition to high side FET 40, a current mirror with a 1:N ratio. This results in a current that is a known ratio of the high side FET current. This current can be measured by measuring the voltage across current mirror resistor (Rmirror) 511; which has a known precise value. Similarly, blocks 502, 503, 504 (for phases 2, 3, and 4) include a current mirror in addition to the high side FET. The current in the second, third and fourth phases is measured across precision current mirror resistors 512, 513, and 514, respectively. The current passing through the current mirror will track the load current with temperature. However, the high side FET is typically conducting for a much shorter period than the low side FET and therefore represents the load current for a shorter period of time. Also, the extra chip area used by the current mirrors and the need for precision resistors can increase the cost of sensing current with this embodiment. Most significantly, the power consumed by the current mirror is negligible so that the current is sensed essentially in a lossless manner.

In the FIG. 9 embodiment, calibration can compensate for various process induced differences in the components. For example, variations in the actual ratio of the current mirror current to the current passing through the high side FET can be compensated. As in other embodiments, variations in the response of sense amplifiers 130, 140, 150 and 160 can be compensated. For example, when the low side FETs are on, the corresponding high side FETs are off and the resultant sense amplifier output should indicate zero current. To the extent a sense amplifier provides a current that is not zero, this is a known error that can be compensated by subtracting out the error in the measured current.

Figure 10:
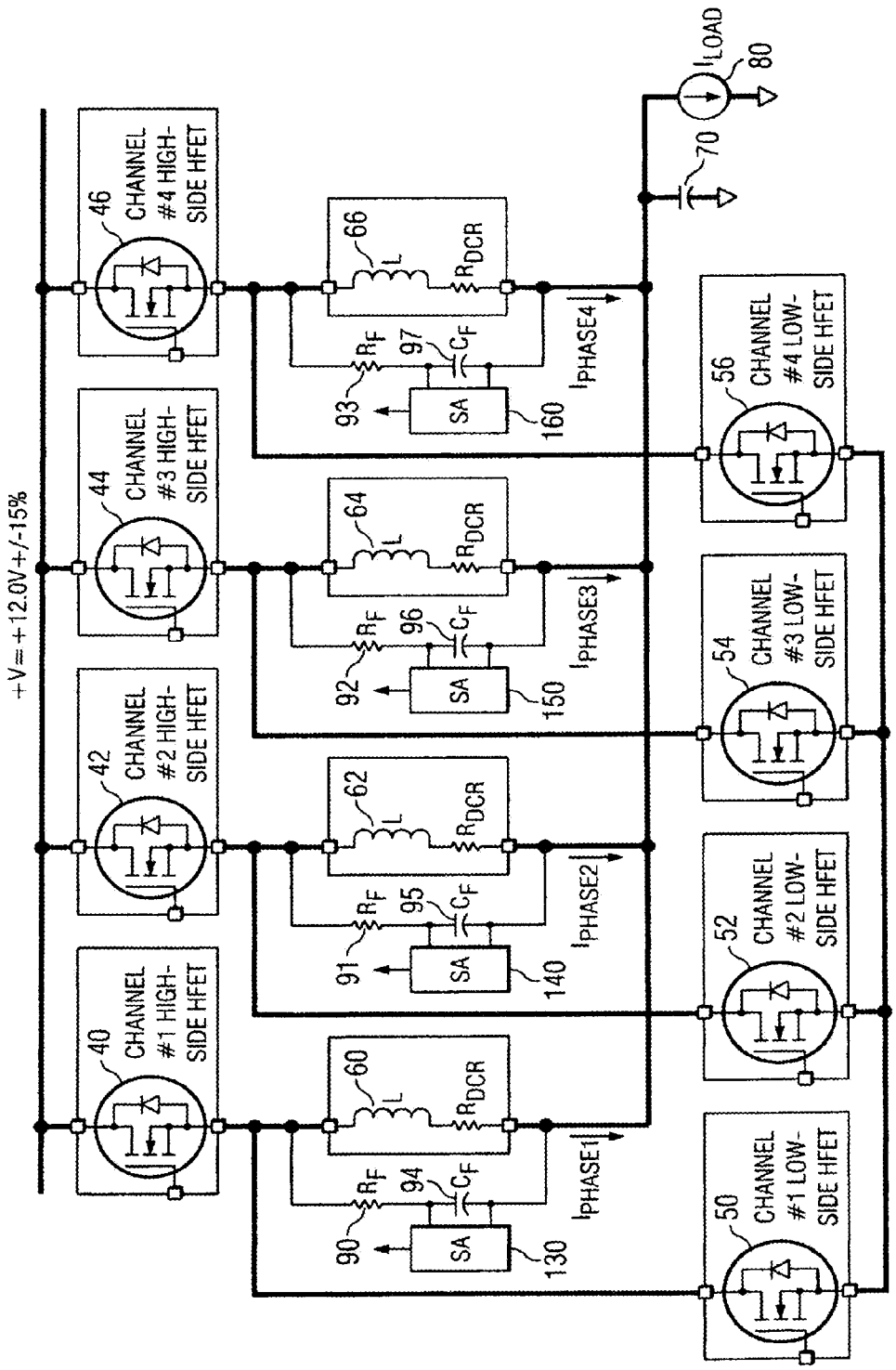

Refer now to FIG. 10, for a still further embodiment, sensing current through the direct current resistance (DCR) of an inductor. As in FIG. 9, FIG. 10 illustrates a four phase system. Corresponding elements have again been numbered with corresponding numerals. In each phase, a resistor and capacitor have been added in parallel with the inductor. Thus phases 1-4 have resistors 90, 91, 92, and 93 and capacitors 94, 95, 96, and 97, respectively connected in series in each stage and in parallel with the inductor in that phase, all as shown. In addition the DC resistive component is separately shown for each of the inductors as RDCR. It is known that all inductors have inherent DC resistors. However, in this example, inductors with relatively high DC resistance with known resistor values are selected. This permits accurate current measurement in a Wheatstone Bridge like arrangement. The AC component of the voltage is filtered out and the voltage across the capacitors 94, 95, 96, and 97 is the same as the voltage across the corresponding RDCR resistor. Therefore, a voltage measurement across these capacitors provides the actual current simply by dividing the voltage by the known resistance. The processing of this precisely known current is then accomplished in the same manner as previously described.

Figure 11:
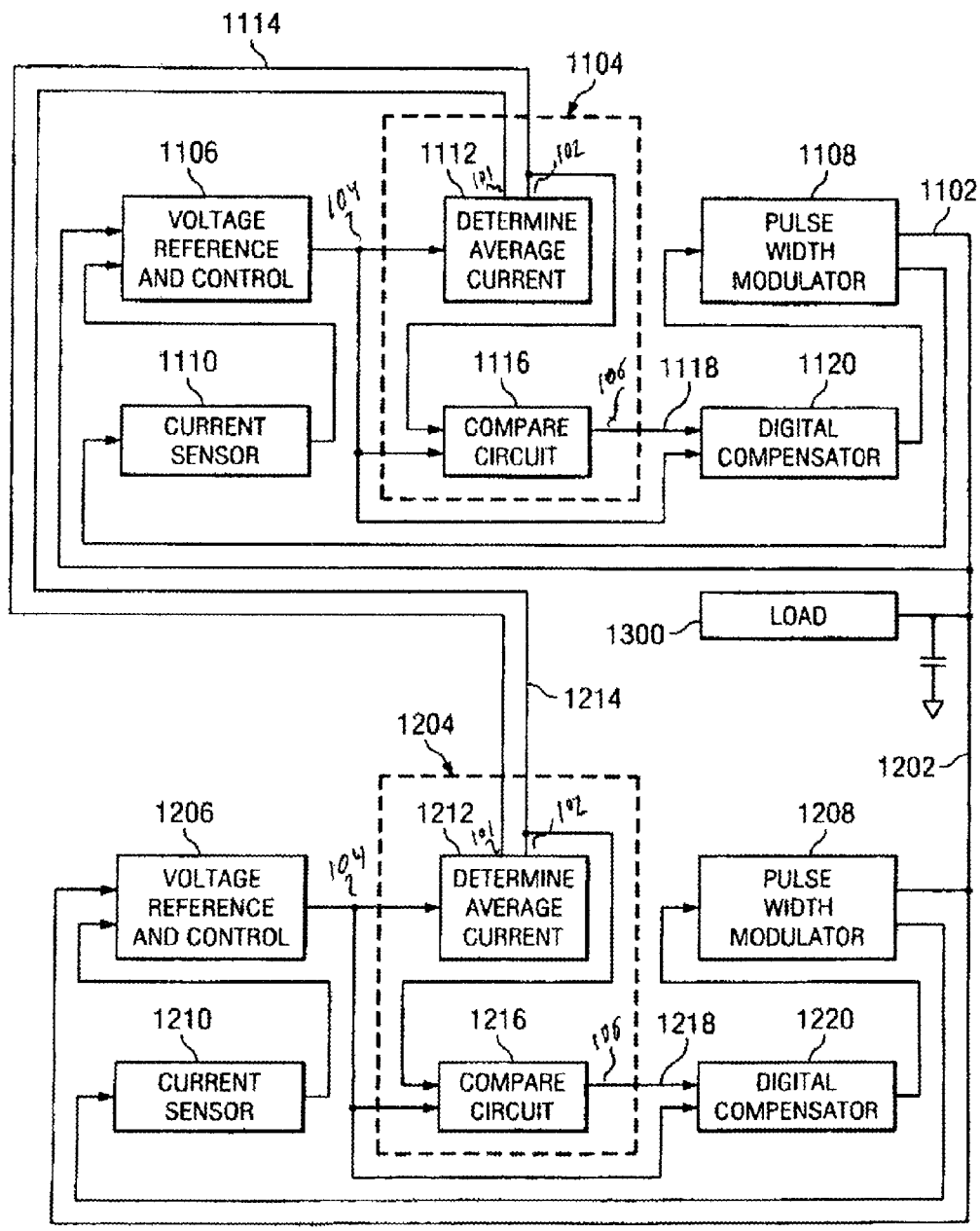
FIG. 11 is a simplified illustration of an embodiment.

Refer now to FIG. 11 illustrating an embodiment in simplified block diagram format. FIG. 11 shows two regulators, such as regulator 10 (FIG. 1). A first regulator has an output line 1102 coupled to load 1300 for supplying current to load 1300 during a first phase. A second regulator, usually of the same construction as the first regulator, has an output line 1202 coupled to load 1300. A first current share circuit 1104 is coupled to the load for measuring and comparing the current provided to the load 1300 during the first phase. In the digital implementation, current share circuit 1104 comprises the circuitry illustrated in FIG. 5. In the analog implementation, current share circuit 1104 comprises the circuitry illustrated in FIGS. 2 and 3, including capacitor C1 and the summing node 212. The load voltage is coupled to voltage reference and control circuit 1106. Voltage reference and control circuit 1106, in this case, comprises all of elements 12-19 as shown in FIG. 1. The current provided to the load 1300 is coupled to first current share circuit 1104 via pulse width modulator 1108, current sensor 1110 and voltage reference and control circuit 1106. Note that in this simplified block diagram, pulse width modulator 1108 includes the drivers and other output circuitry shown coupled between PWM 20 and load 80 in FIG. 1. Circuitry within first current share circuit 1104 includes a circuit 1112 to determine the average current to be shared by the regulators. In the digital implementation, circuit 1112 comprises circuits 306, 308, and 326, as illustrated in FIG. 5. In the analog implementation, circuit 1112 comprises the corresponding circuitry in FIGS. 2 and 3 and particularly includes capacitor C1 connected across summing node 212 and the star connection node S specifically illustrated in FIG. 2.

The output of circuit 1112 on conductive line 1114 is the overall average current to be shared by the regulators and is coupled to the input of compare circuit 1116. In the digital implementation, compare circuit 1116 is similar in construction to compare circuit 310 in FIG. 5 and typically also includes integrator 316. Compare circuit 1116 receives the value of the average current provided by this first regulator during the first phase as a second input and compares the average current with the overall average current to be shared by the regulators. Compare circuit 1116 then provides an output on conductive line 1118 to digital compensator 1120; which then provides an output to pulse width modulator 1108, thereby adjusting the current supplied to the load on line 1102.

FIG. 11 also shows a second regulator, such as regulator 10 (FIG. 1). The second regulator is usually of the same construction as the first regulator and has an output line 1202 coupled to load 1300 for supplying current to load 1300 during a second phase. A second current share circuit 1204 is coupled to the load 1300 for measuring and comparing the current provided to the load 1300 during the second phase. In the digital implementation, current share circuit 1204 comprises the circuitry illustrated in FIG. 5. In the analog implementation, current share circuit 1204 comprises the circuitry illustrated in FIGS. 2 and 3, including capacitor C1 and the summing node 212. The load voltage is coupled to voltage reference and control circuit 1206. Voltage reference and control circuit 1206, in this case, comprises all of elements 12-19 as shown in FIG. 1.

The current provided to the load 1300 is coupled to second current share circuit 1204 via pulse width modulator 1208, current sensor 1210 and voltage reference and control circuit 1206. Note that in this simplified block diagram, pulse width modulator 1208 includes the drivers and other output circuitry shown coupled between PWM 20 and load 80 in FIG. 1. Circuitry within second current share circuit 1204 includes a circuit 1212 to determine the average current to be shared by the regulators. In the digital implementation, circuit 1212 comprises circuits 306, 308, and 326, as illustrated in FIG. 5. In the analog implementation, circuit 1212 comprises the corresponding circuitry in FIGS. 2 and 3 and particularly includes capacitor C1 connected across summing node 212 and the star connection node S specifically illustrated in FIG. 2.

The output of circuit 1212 on conductive line 1214 is the overall average current to be shared by the regulators and is coupled to the input of compare circuit 1216. In the digital implementation, compare circuit 1216 is similar in construction to compare circuit 310 in FIG. 5 and typically also includes integrator 316. Compare circuit 1216 receives the value of the average current provided by this second regulator during the second phase as a second input and compares the average current with the overall average current to be shared by the regulators. Compare circuit 1216 then provides an up or down output on conductive line 1218 to digital compensator 1220; which then provides an output to pulse width modulator 1208, thereby adjusting the current supplied to the load by this second regulator on line 1202.

As previously described in connection with FIGS. 2 and 3, for example, the up or down output from on line 1218 can be configured to be only a down output and can also be configured to be provided only if a relatively significant change is desired in accordance with an embodiment of the hysteresis feature. In the case of the two illustrated regulators, a down output would be provided on either line 1118 or 1218.

The first current share circuit 1104 and second current share circuit 1204 are coupled by means of first conductor 1114 and second conductor 1214. In the illustrated digital example, the output conductor 1114 of the first current share circuit 1112 is provided as an input to second current share circuit 1204. Similarly, the second conductor 1214 provides the output of the second current share circuit 1204 as an input to the first current share circuit 1104. This is the daisy chain connection also illustrated in FIG. 6A as used for the digital implementation. For the analog implementation, as illustrated in FIG. 6B, the first conductor of the first current share circuit and the first conductor of the second current share circuit are coupled. Although not specifically illustrated in FIG. 11, in the analog implementation, the connection of conductive lines 1114 and 1214 would be reversed at one of current share circuits 1104 or 1204. These and various other modifications and changes are within the spirit and scope of the embodiments described herein. For example, the current supplied to current sensor 11 in FIG. 1 can be supplied by a lossless technique including a circuit in the regulator having a current mirror as shown in FIG. 9. In accordance with another lossless sensing technique, a regulator comprises an inductor, e.g. 60 coupled between an output of each of the regulators and the load and a circuit in parallel with each inductor as illustrated in FIG. 10.

The present invention has been described above with reference to various exemplary embodiments. However, those skilled in the art will recognize that additional changes and modifications may be made to the exemplary embodiments without departing from the scope of the present invention. By way of further example, the various components may be implemented in alternate ways, such as, for example, by providing other configurations of transistors either integrated or as discrete devices and of bipolar (NPN or PNP) and MOS (P channel or N channel) or any combination thereof. These alternatives can be suitably selected depending upon the particular application or in consideration of any number of factors associated with the operation of the system. These and other changes or modifications are intended to be included within the scope of the embodiments described herein.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for balancing current supplied by a plurality of regulators coupled to a load, the system comprising:
    a current sensor operable to measure an average load current supplied by each regulator;
    a current share circuit operable to determine an overall average current to be shared by the plurality of regulators, and compare each average load current with the overall average current to be shared by the plurality of regulators; and
    a digital compensator operable to adjust an output current of one or more of the plurality of regulators so that the plurality of regulators supply the same current to the load.

2. The system of claim 1, wherein an active phase of each regulator occurs at a different time, and wherein the average load current supplied by each regulator is measured by the current sensor during the active phase of the corresponding regulator.

3. The system of claim 2, wherein the current share circuit comprises comparators operable to compare each average load current with the overall average current to be shared by the plurality of regulators, by providing a binary up or down signal based on the relative amplitude of the compared current values.

4. The system of claim 3, wherein the comparators provide the binary up or down signal only if the difference between the amplitudes of the compared current values exceeds a predetermined amount.

5. The system of claim 1, wherein the current share circuit is operable to iteratively determine the overall average current to be shared by the plurality of regulators.

6. The system of claim 5, wherein the current share circuit comprises a current mirror operable to sense the average load current supplied by each regulator.

7. The system of claim 5, wherein each one of the plurality of regulators has an inductor at its output and the current share circuit comprises a capacitor coupled in parallel with the inductor for sensing the average load current.

8. The system of claim 1, wherein an input of each regulator is coupled to a common node and the current share circuit is operable to determine the overall average current to be shared by the plurality of regulators at the common node.

9. A system for supplying current to a load, the system comprising:
a first regulator operable to supply current to the load during a first phase;
a second regulator operable to supply current to the load during a second phase;
a current sensor operable to determine a first average current provided to the load during the first phase and a second average current provided to the load during the second phase; and
a current share circuit operable to determine an overall average current to be shared by the first and second regulators, the current share circuit comprising:
a first compare circuit operable to compare the first average current provided to the load during the first phase with the overall average current to be shared by the first and second regulators; and
a second compare circuit operable to compare the second average current provided to the load during the second phase with the overall average current to be shared by the first and second regulators.

10. The system of claim 9, further comprising a digital compensator operable to adjust the current output of one of the first and second regulators based on the comparison of the average currents with the overall average current to be shared by the first and second regulators.

11. The system of claim 10, wherein the digital compensator is operable to adjust the current output of either the first regulator or the second regulator only when a difference between at least one of the compared first and second average currents and the overall average current exceeds a predetermined value.

12. The system of claim 9, wherein an input of the first regulator and an input of the second regulator are coupled to a common node and the current share circuit is operable to determine the overall average current to be shared by the first and second regulators at the common node.

13. A system for supplying current to a load, the system comprising:
a capacitor having a first plate and a second plate spaced apart from the first plate;
a first regulator coupled to the load and having an input coupled to the first plate of the capacitor and an output coupled to the second plate of the capacitor;
a second regulator coupled to the load and having an input coupled to the first plate of the capacitor and an output coupled to the second plate of the capacitor;
a current share circuit operable to balance a current provided by the first regulator to the load and a current provided by the second regulator to the load, based on a comparison of an overall average current value with the current provided by each regulator, and determine the overall average current value at the first plate of the capacitor.

14. The system of claim 13, further comprising a digital compensator operable to adjust the current output of either the first regulator or the second regulator based on the comparison of the overall average current value with the current provided by each regulator so that the current provided by the first and second regulators to the load are balanced.

15. The system of claim 14, wherein the digital compensator is operable to adjust the current output of either the first regulator or the second regulator only when the difference between the overall average current value and the current provided by either regulator exceeds a predetermined value.

* * * * *